United States Patent [19]

Ohmae et al.

[11] Patent Number: 4,946,895

[45] Date of Patent: Aug. 7, 1990

[54] RESINOUS COMPOSITION FOR POWDER COATING

[75] Inventors: Tadayuki Ohmae; Kentaro Mashita, both of Chiba; Kizuku Wakatsuki; Toshio Kawakita, both of Osaka, all of Japan

[73] Assignee: Sumitomo Chemical Company, Ltd., Osaka, Japan

[21] Appl. No.: 414,281

[22] Filed: Sep. 29, 1989

Related U.S. Application Data

[63] Continuation of Ser. No. 232,829, Aug. 16, 1988, abandoned.

[51] Int. Cl.$^5$ .................... C08L 53/00; C08L 51/06
[52] U.S. Cl. ........................................ 525/75; 525/71
[58] Field of Search ...................... 525/75, 71

[56] References Cited

U.S. PATENT DOCUMENTS

| | | |
|---|---|---|
| 4,301,062 | 6/1977 | Shirayama et al. . |
| 4,551,501 | 11/1985 | Shiga et al. ............... 525/88 |
| 4,562,230 | 12/1985 | Fukui et al. ............... 525/74 |
| 4,762,882 | 8/1988 | Okano et al. ............... 525/74 |

FOREIGN PATENT DOCUMENTS

| | | |
|---|---|---|
| 58-52338 | 3/1983 | Japan . |
| 59-30841 | 2/1984 | Japan . |

*Primary Examiner*—C. Warren Ivy
*Attorney, Agent, or Firm*—Cushman, Darby & Cushman

[57] ABSTRACT

A resinous composition suitable for powder coating on metals on which a heat resistant coating layer is formed contains (A) modified polypropylene in which unsaturated carboxylic acid or anhydride is grafted on crystalline propylene/α-olefin copolymer, (B) ethylene polymer, (C) metal oxide or hydroxide and (D) polymers of $C_6$ or more vinyl cycloalkane and the composition contains 0.001–1.0% by weight of the vinyl cycloalkane unit.

8 Claims, No Drawings

RESINOUS COMPOSITION FOR POWDER COATING

This is a continuation of application Ser. No. 232,829, filed Aug. 16, 1988, and now abandoned.

The present invention relates to a resinous composition for powder coating, more particularly a resinous composition which is excellent in adhesion with a metal and is able to form a coating layer which is superior in heat resistance and extensibility, compounding a given amount each of (A) modified polypropylene, (B) ethylene polymer, (C) metal oxide or hydroxide and (D) polymers of vinyl cycloalkane having at least six carbon atoms.

Powder coating on the basis of such olefin polymer as ethylene polymer and propylene polymer has been widely used to provide corrosion resistance, chemical resistance, durability, staining resistance and so on to metal articles Difficulty encountered in this sort of coating is that the coating is inferior in adhesion with metals since olefin polymer is non-polar Modification of olefin polymer, e.g., grafting or copolymerizing monomers having polar groups on or with the olefin polymer is proposed in order to solve the difficulty above (Japanese patent Kokai Nos. 48-103645, 54-155242, 55-118975, 59-36841 and others). However, these improvements in adhesion with metals are not satisfactory yet even after such modification is made.

Furthermore, ethylene polymer hardly provides enough heat resistance when coating is made on pipes for supplying hot water, environmental parts of engines of automobiles and so on which are subjected to high temperature Propylene polymer is not tolerable with respect to rust prevention or protection, since elongation of coated layer is so small that the layer is ready to be cracked when deformation working of a metal base is made or impact is applied to, although the polymer is superior in heat resistance.

According to the present invention, a resinous composition suitable for powder coating is provided which comprises (A) 80-95 parts by weight of polypropylene modified by grafting unsaturated carboxylic acid anhydride thereof on at least a part of crystalline random copolymer of (a) 90-99% by weight of propylene and (b) 10-1% by weight of α-olefin having 2-10 carbon atoms excluding propylene, (B)20-5 parts by weight of ethylene polymer, (C) 0.1-10 parts by weight of metal oxide or hydroxide, and (D) a sufficient amount of vinyl cycloalkane polymer to have 0.001-1.0 % by weight of vinyl cycloalkane unit contained in the composition, said cycloalkane having at least six carbon atoms.

The present composition is so ready to be pulverized mechanically that a period of time to this effect is short and energy required is small. Coated layer produced by fluidized dipping or electrostatic coating has the following features:
1. good at adhesion with a metal,
2. superior in heat resistance,
3. high elongation and excellent in bending,
4. high surface hardness and hardly scratched and
5. good at melt flowability, so that surface is smooth.

Examples of shaped articles to which the present coating is applied are
1. kitchen appliances such as hot water supplying pipes and a drainboard,
2. parts for automobiles such as an electro magnetic shield,
3. household appliances such as a dishwasher and a basket in a washing machine and
4. others such as gardening tools, building materials and daily goods.

(A) Modified polypropylene

Basic resin is crystalline random copolymer comprising (a) 90-99% by weight of propylene and (b) 10-1% by weight of α-olefin having 2-10 carbon atoms excluding propylene. Preference is that α-olefin is ethylene and is used in an amount of 2-8% by weight.

When α-olefin (b) used is less than 1% by weight, smooth coating surface is scarcely produced, since melting point and melt viscosity of the resin are too high. Although smooth surface of coated layer is able to be obtained when a base metal is pre-heated to 300 ° C or higher at fluidized dipping coating, such layer is not excellent in respect to strength and elongation, since the layer has been subjected to heat degration. When an amount of α-olefin (b) exceeds 10% by weight, coated layer is inferior in heat resistance and surface hardness, since melting point of the resin is too low. Preferable melt index (JIS K-6758, referred to hereinafter as "MI") is 1-20.

Modified polypropylene is prepared by any of conventional processes such as those disclosed in Japanese patent Kokoku Nos. 43-27421 (melt kneading process), 44-15422 (solution modification process) and 43-18144 (slurry modification process)

Unsaturated carboxylic acid for grafting is acrylic acid, methacrylic acid, maleic acid, fumaric acid, itaconic acid, crotonic acid, citraconic acid, sorbic acid, mesaconic acid and the like Unsaturated dicarboxy anhydride is maleic anhydride, itaconic anhydride, citraconic anhydride, himic anhydride, and the like. Preference are acrylic acid and maleic anhydride.

Peroxide used in grafting is 2,5-dimethyl-2,5-di(t-butylperoxy)hexane, 2,5-dimethyl-2,5-di(t-butylperoxy)hexyne-3,dicumylperoxide, t-butylperoxylaurate, T-butylperoxyisobutyrate, diisopropylbenzene hydroperoxide and the like. Proper variety of peroxide is selected depending on basic resin to be modified and conditions for modification. Grafting is effected usually at 100°-250° C.

Grafted polypropylene thus obtained may be used alone and in the form of a mixture with unmodified polypropylene.

Unsaturated carboxylic acid or anhydride thereof contained in grafted polypropylene is preferably 0.01-5 parts by weight per 100 parts by weight of the crystalline random copolymer. When the amount is smaller than 0.01 part by weight, lack in adhesion is brought about and when the amount is larger than 5 parts by weight, discoloration is caused.

MI of modified polypropylene is preferably 10-60.

(B) Ethylene polymer

Suitable ethylene polymer is low density polyethylene or linear low density polyethylene Copolymer of ethylene with 10% by weight or less of ester of unsaturated carboxylic acid or vinyl ester of fatty acid may be used, said esters being such as vinyl acetate, vinyl propionate, methyl acrylate, ethyl acrylate and methyl methacrylate.

(C) Metal oxide or hydroxide

Proper oxide or hydroxide is that of metals of IIa, IIIa and IVb of the Mendeleev's Periodic Table.

Example is magnesium oxide, calcium oxide, aluminum oxide and titanium dioxide Preference is magnesium oxide, most preferably powdery one having at least 20 mg I/g MgO in terms of iodine absorption, such as "Kyowa Mag" ® 30 manufactured by Kyowa Kagaku Co., Ltd., Japan.

Example of hydroxide is magnesium hydroxide, calcium hydroxide, o-titanic acid, strontium hydroxide and the like, preferably calcium hydroxide.

Median diameter of the metal oxide or hydroxide is usually smaller than 25 μm, preferably smaller than 10 μm, from view points of uniform dispersibility in a resin phase and an improvement in adhesion.

(D) Polymer of vinyl cycloalkane

The polymer includes homopolymer of vinyl cycloalkane, random copolymer of a vinyl cycloalkane with a small amount of the other vinyl cycloalkane or α-olefin or block copolymer of vinyl cycloalkane with α-olefin.

The block copolymer mentioned above is copolymer obtained by multi-step copolymerization between vinyl cycloalkane and α-olefin. It includes (1) copolymer obtained by polymerization of propylene alone after polymerization of vinyl cycloalkane is effected, (2) copolymer obtained by random co-polymerization of propylene and the other α-olefin after polymerization of vinyl cycloalkane is effected, (3) copolymer obtained by random copolymerization with propylene alone or other α-olefin after vinyl cycloalkane firstly is polymerized and secondly propylene alone is polymerized. Preferable copolymer is the block copolymer above, and most preferably block copolymer with propylene as exemplified in (1)–(3) above.

Vinyl cycloalkane has six or more carbon atoms and includes vinyl cyclobutane, vinyl cyclopentane, vinyl-3-methylcyclopentane, vinyl cyclohexane, vinyl-2-methylcyclohexane, vinyl-3-methylcyclohexane, vinyl norbornane and the like.

(E) Compounding ratio

The present composition contains (A), (B), (C) and (D) in amounts of 80–95 parts by weight, 20–5 parts by weight, preferably 15–7 parts by weight, 0.1–10 parts by weight, preferably 0.5–5 parts by weight, and up to 20 parts by weight, respectively As to (D), it should be controlled so that 0.001–1.0% by weight in terms of vinyl cycloalkane unit is present in the composition.

When amount of (B) is smaller than 5 parts by weight, no smooth surface of coated layer is obtained, but when the amount is larger than 20 parts by weight, remarkable degradation is brought about in heat resistance as well as in hardness of coating When amount of (C) is shorter than 0.1 part by weight, adhesion with a metal is decreased, while when the amount exceeds 10 parts by weight, elongation is lowered and smooth and glossy coated layer is rarely produced Furthermore, the use of such a large amount is not economical, since it is beyond saturation.

(F) Production of the composition

Any of conventional melt-kneading processes for an olefin polymer composition is available, e.g., those using mixing rolls, kneaders, Banbury mixers or extruders. Before the melt-kneading, it is preferable to dry-blend the components by Henschel mixers, ribbon blenders or tumblers until a uniform composition is prepared After being melt-kneaded, a composition is pelletized, mechanically pulverized under room temperature or freezing to obtain a powder coating composition Other additives may be added, if desired, such as commercially available phenol, sulfur or phosphor antioxidants such as "Irganox" ® 1010, "Cyanox" ® 1790, "Sumilizer" ® BHT, "Goodright" ® 3114, "Sumilizer" ® TPS, and "Mark" ® PEP-8; commercially available benzotriazole, benzophenone and hindered amine light resistant agents such as "Tinuvi" ® 328, "Sumisorb" ® 510, "Sanol" ® 770, "Tinuvin" ® 622; halogen, phosphorus and inorganic fire retardants such as tetrabromobisphenol A, tris (β-chloroethyl)phosphate, antimony trioxide and magnesium hydroxide; pigments such as copper phthalocyanine blue, submarine blue, carbon black, titanium dioxide and cadmium yellow; fillers such as calcium carbonate, magnesium carbonate, calcium sulfate, magnesium sulfate, silicon dioxide, alumina, talc, mica, glass fiber, kaolin and wood powder, and the like.

Materials to be coated are metals such as iron, aluminum, zinc, tin and their alloys and metals or glass on which the metals above are plated. They may be in any shape such as pipes, bars, wires, plates, boxes and the like.

The present composition may be applied to by fluidized dipping, rotary shaping, sintering shaping or electrostatic coating.

EXAMPLES

The present invention is explained in more detail by the following non-limitative examples (a) Fluidized dipping coating Into a fluidized dipping vessel having a porous plate at a bottom is charged a powdery composition (80 mesh or less) prepared by a mechanical pulverizer.

Air is charged from the bottom of the vessel to form a stable fluidizing bed of the powder. A grid blasted steel plate (roughness: No. 100, produced by Taiyu Kizai K.K., defatted by xylene, 150 mm ×70 mm ×3.2 mm) which has been heated in an oven at 230° C., is dipped in a fluidizing bed for 15 seconds. After being taken out, the plate is subjected to baking in an oven (200° C.) for 5 minutes and left to stand at room temperature until a coated plate is obtained (b) Melt Index JIS K-6758 for propylene polymer (230° C., 2.16 Kg load)

JIS K-6760 for ethylene polymer (190° C., 2.16 Kg load)

(c) Adhesion

Coated layer obtained in (a) above is slit into a strip (1 mm wide) and subjected to a tear tester (50 mm/minute) to observe a value when peeling reaches 180°.

(d) Elongation

Silicon grease is coated as a parting agent on a steel plate before being subjected to fluidized dipping. Coated layer is ready to be peeled off. Coated layer parted is slit to a strip (1 mm wide) and subjected to a tensile tester (50 mm/minute).

(e) Surface smoothness

Marked eye observation.

(f) Heat resistance

Vicat softening point (1 Kg load) according to JIS K-7206 using coated layer obtained in the same manner as in (d). Test specimens are piled up at least 1 mm high.

(g) Surface hardness

Shore hardness according to JIS K 7215 using coated layer obtained in the same manner as in (d).

(h) Limiting viscosity [η]

Ubbelohde viscometer is used (135° C., in tetralin or 20° C. in carbon tetrachloride).

EXAMPLE 1

Crystalline propylene/ethylene random copolymer (ethylene 2.3 % by weight; MI: 7.6 g/10 min., hereinafter preferred to as PP (1), 100 parts by weight), t-butyl peroxyaurate (0.2 part by weight), maleic anhydride (0.5 part by weight) and "Irganox"® 1010 (produced by Ciba Geigy, 0.2 part by weight, antioxidant) were dry-blended for 3 minutes in a Henschel mixer.

The blend was extruded at 200° C. through a uni-axial extruder (30 mm in diameter) to obtain modified PP(1).

The PP(1) (90 parts by weight), low density polyethylene (hereinafter referred to LDPE) and magnesium oxide ("Kyowa Mag"® 30, 20 parts by weight), propylene/vinyl cyclohexane copolymer (hereinafter referred to as PVCH (1), 1.0 part by weight), "Irganox"® 1010 (0.2 part by weight, an antioxidant) and calcium stearate (0.03 part by weight, a neutralizer) were dry-blended in a Henschel mixer for 3 minutes. The blend was melt-kneaded at 200° C. in a uni-axial extruder (30 mm in diameter) to product pellets (MI: 39 g/10 min.) which were subjected to a pulvelizer to obtain powder (80 mesh or less).

Powder coating was effected by fluidized dipping. Evaluation of coated layer is shown in Table 1.

EXAMPLES 2-14 AND COMPARATIVE EXAMPLES 1-6

Fluidized dippings were carried out according to Example 1 under the temperatures of steel plates heated before the dipping, using varieties and amounts of A, B, C and D components given in Table 1.

Results are shown in Table 1.

The table substantiates that components C and D are critical factors to adhesion to metals and elongation of coated layer.

TABLE 1

| | (A) component | | (B) component | | (C) component | | (D) component | |
|---|---|---|---|---|---|---|---|---|
| | Variety | Part by weight | Variety | Part by weight | Variety | Part by weight | Variety | Part by weight |
| Example | | | | | | | | |
| 1 | Modified PP (1) Note[1] | 90 | LDPE Note[4] | 10 | MgO (1) Note[8] | 2.0 | PVCH (1) Note[12] | 1.0 |
| 2 | Modified PP (1) | 90 | LLDPE Note[5] | 10 | MgO (1) | 2.0 | PVCH (1) | 1.0 |
| 3 | Modified PP (1) | 90 | LDPE | 10 | MgO (1) | 2.0 | PVCH (2) Note[13] | 10 |
| 4 | Modified PP (1) | 90 | LDPE | 10 | MgO (1) | 2.0 | PVCH (3) Note[14] | 0.02 |
| 5 | Modified PP (2) Note[2] | 90 | LDPE | 10 | MgO (1) | 2.0 | PVCH (1) | 1.0 |
| 6 | Modified PP (2) | 90 | LDPE | 10 | MgO (1) | 2.0 | PVCH (2) | 10 |
| 7 | Modified PP (2) | 90 | LDPE | 10 | MgO (1) | 1.0 | PVCH (2) | 10 |
| 8 | Modified PP (2) | 90 | EVA Note[6] | 5 | MgO (1) | 2.0 | PVCH (1) | 1.0 |
| 9 | Modified PP (2) | 90 | EMMA Note[7] | 5 | MgO (1) | 2.0 | PVCH (1) | 1.0 |
| 10 | Modified PP (2) | 90 | LDPE | 10 | MgO (2) Note[9] | 2.0 | PVCH (1) | 1.0 |
| 11 | Modified PP (2) | 90 | LDPE | 10 | Ca(OH)$_2$ Note[10] | 2.0 | PVCH (2) | 10 |
| 12 | Modified PP (2) | 90 | LDPE | 10 | Ca(OH)$_2$ | 1.0 | PVCH (2) | 10 |
| 13 | Modified PP (2) | 90 | LDPE | 10 | Mg(OH)$_2$ Note[11] | 2.0 | PVCH (2) | 10 |
| 14 | Modified PP (3) Note[3] | 90 | LDPE | 10 | MgO (1) | 2.0 | PVCH (1) | 1.0 |
| Comparative Example | | | | | | | | |
| 1 | Modified PP (1) | 100 | — | — | — | — | — | — |
| 2 | Modified PP (1) | 90 | LDPE | 10 | — | — | — | — |
| 3 | Modified PP (1) | 90 | LDPE | 10 | — | — | PVCH (1) | 1.0 |
| 4 | Modified PP (1) | 90 | LDPE | 10 | MgO (1) | 2.0 | — | — |
| 5 | Modified PP (1) | 75 | LDPE | 25 | MgO (1) | 2.0 | PVCH (1) | 1.0 |
| 6 | Modified PP (2) | 90 | LDPE | 10 | MgO (1) | 2.0 | PP (2) Note[15] | 10 |
| 7 | Modified PP (2) | 90 | LDPE | 10 | MgO (1) | 2.0 | PP (3) Note[16] | 10 |

| | Temperature of steel plate when fluidized dipping coating is effected (°C.) | Thickness of coated layer (mm) | Adhesion strength (Kg/cm) | Surface smoothness | Elongation (%) | Vicat softening point (°C.) | Shore hardness (D) |
|---|---|---|---|---|---|---|---|
| Example | | | | | | | | 
| 1 | 230 | 0.33 | Peeling off impossible | Good | 100 | 129 | 65 |
| 2 | 250 | 0.37 | Peeling off | Good | 90 | 131 | 65 |

TABLE 1-continued

| | | | | | | | |
|---|---|---|---|---|---|---|---|
| 3 | 230 | 0.38 | Peeling off impossible | Good | 100 | 127 | 65 |
| 4 | 240 | 0.27 | Peeling off impossible | Good | 70 | 131 | 65 |
| 5 | 230 | 0.37 | Peeling off impossible | Good | 180 | 128 | 65 |
| 6 | 230 | 0.34 | Peeling off impossible | Good | 190 | 130 | 63 |
| 7 | 230 | 0.31 | Peeling off impossible | Good | 170 | 131 | 64 |
| 8 | 230 | 0.38 | Peeling off impossible | Good | 150 | 129 | 62 |
| 9 | 230 | 0.36 | Peeling off impossible | Good | 140 | 128 | 63 |
| 10 | 230 | 0.30 | Peeling off impossible | Good | 170 | 130 | 64 |
| 11 | 240 | 0.35 | Peeling off impossible | Good | 160 | 131 | 65 |
| 12 | 240 | 0.39 | Peeling off impossible | Good | 180 | 129 | 65 |
| 13 | 240 | 0.34 | Peeling off impossible | Good | 170 | 130 | 64 |
| 14 | 240 | 0.38 | Peeling off | Good impossible | 190 | 128 | 63 |
| Comparative Example | | | | | | | |
| 1 | 240 | 0.24 | 1.3 | Bad | 10 | 132 | 66 |
| 2 | 230 | 0.33 | 1.5 | Good | 10 | 129 | 63 |
| 3 | 230 | 0.32 | 2.0 | Good | 110 | 131 | 64 |
| 4 | 230 | 0.36 | Peeling off impossible | Good | 20 | 128 | 63 |
| 5 | 230 | 0.34 | Peeling off impossible | Good | 100 | 118 | 54 |
| 6 | 230 | 0.35 | Peeling off impossible | Good | 10 | 130 | 65 |
| 7 | 230 | 0.31 | Peeling off impossible | Good | 10 | 131 | 65 |

Notes
[1] Modified PP (1): maleic anhydride-modified product (maleic anhydride content; 0.1% by weight and MI; 48 g/10 min.) of crystalline propylene/ethylene random copolymer (ethylene content; 2.3% by weight and MI; 7.6 g/10 min.)
[2] Modified PP (2): blended product (MI; 22 g/10 min.) of 40 parts by weight of modified PP (1) and 60 parts by weight of crystalline propylene/ethylene random copolymer (ethylene content; 2.3% by weight and MI; 17.6 g/10 min.)
[3] Modified PP (3): maleic anhydride-modified product (maleic anhydride content; 0.11% by weight and MI; 51 g/10 min.) of crystalline propylene/butene-1 copolymer (butene-1 content; 6.7% by weight and MI; 3.8 g/10 min.)
[4] LDPE: low density polyethylene (density; 0.927 g/cm$^3$ and MI; 7.1 g/10 min.)
[5] LLDPE: linear low density polyethylene (density; 0.925 g/cm$^3$ and MI; 6.8 g/10 min.)
[6] EVA: ethylene/vinyl acetate random copolymer (vinyl acetate content; 6.3% by weight and MI; 6.7 g/10 min.)
[7] EMMA: ethylene/methyl methacrylate random copolymer (methyl methacrylate content; 9.7% by weight and MI; 7.0 g/10 min.)
[8] MgO (1): "Kyowa Mag" ® 30; a product of Kyowa Kagaku Co. (median diameter; 2.7 μm, iodine absorption; 35 mg I/g MgO)
[9] MgO (2): "Kyowa Mag" ® 100; a product of Kyowa Kagaku Co. (median diameter; 2.5 μm, iodine absorption; 110 mg I/g MgO)
[10] Ca(OH)$_2$: reagent, first class, a product of Wako Junyaku Co. (median diameter; 2.4 μm)
[11] Mg(OH)$_2$: reagent, a product of Wako Junyaku Co. (median diameter; 3.1 μm)
[12] PVCH (1): propylene/vinyl cyclohexane copolymer (limiting viscosity in tetralin; 1.9 dl/g and vinyl cyclohexane content; 0.98% by weight), prepared according to the procedure disclosed in Japanese Patent Kokai Nos. 60-139710 and 60-139731.
[13] PVCH (2): propylene/ethylene/vinyl cyclohexane copolymer (limiting viscosity in tetralin, 2.2 dl/g, ethylene content; 3.4% by weight and vinyl cyclohexane content; 0.21% by weight), prepared according to the similar procedure to PVCH (1).
[14] PVCH (3): vinyl cyclohexane homopolymer (limiting viscosity in carbon tetrachloride; 0.6 dl/g), prepared by similar procedure to PVCH (1).
[15] PP (2): crystalline propylene/ethylene random copolymer (limiting viscosity in tetralin, 2.3 dl/g and ethylene content; 3.8% by weight)
[16] PP (3): propylene homopolymer (limiting viscosity in tetralin; 1.8 dl/g)

I claim:
1. A resinous composition for powder coating which comprises
   (A) 80–95 parts by weight of a modified polypropylene in which an unsaturated carboxylic acid or anhydride thereof is grafted onto at least a part of a crystalline random copolymer of (a) 90–99% by weight of propylene and (b) 10–1% by weight of a α-olefin having 2–10 carbon atoms excluding propylene, said modified polypropylene having a melt index of 10–60 g/10 min. and containing 0.01–5% by weight of said unsaturated carboxylic acid or anhydride thereof,
   (B) 20–5 parts by weight of at least one ethylene polymer selected from a low density polyethylene, a linear low density polyethylene and a copolymer of ethylene with 10% by weight or less of an ester of an unsaturated carboxylic acid or a vinyl ester of a fatty acid,
   (C) 0.1–10 parts by weight of an oxide or hydroxide of a metal of IIa, IIIa or IVb of the Mendelleev's Periodic Table, and
   (D) a vinyl cycloalkane polymer having at least six carbon atoms in such an amount that the units of vinyl cycloalkane are 0.001–1.0% by weight of the composition.
2. A composition according to claim 1, wherein the crystalline random copolymer is a propylene/ethylene copolymer.
3. A composition according to claim 1, wherein the crystalline random copolymer has a melt index of 1–20 g/10 min.
4. A composition according to claim 1, wherein graft-copolymerization for production of the modified poly- propylene (A) is conducted at a temperature of 100°–250° C. in the presence of a peroxide.

5. A composition according to claim 1, wherein the ethylene polymer (B) is a low density polyethylene or linear low density polyethylene.

6. A composition according to claim 1, wherein the metal oxide or hydroxide (C) is magnesium oxide, calcium hydroxide or magnesium hydroxide.

7. A composition according to claim 1, wherein said vinyl cycloalkane is vinyl cyclobutane, vinyl cyclopentane, vinyl-3-methylcyclopentane, vinyl cyclohexane, vinyl-2-methylcyclohexane, vinyl-3-methylcyclohexane or vinyl norbornane.

8. A composition according to claim 7, wherein said vinyl cycloalkane is vinyl cyclohexane.

* * * * *